Oct. 30, 1923.
W. SCHMID
LEVEL WIND REEL
Filed April 29, 1922
1,472,684
2 Sheets-Sheet 1

Inventor
William Schmid,
Attorneys

Oct. 30, 1923.                                                                    1,472,684
W. SCHMID
LEVEL WIND REEL
Filed April 29, 1922                                   2 Sheets-Sheet 2
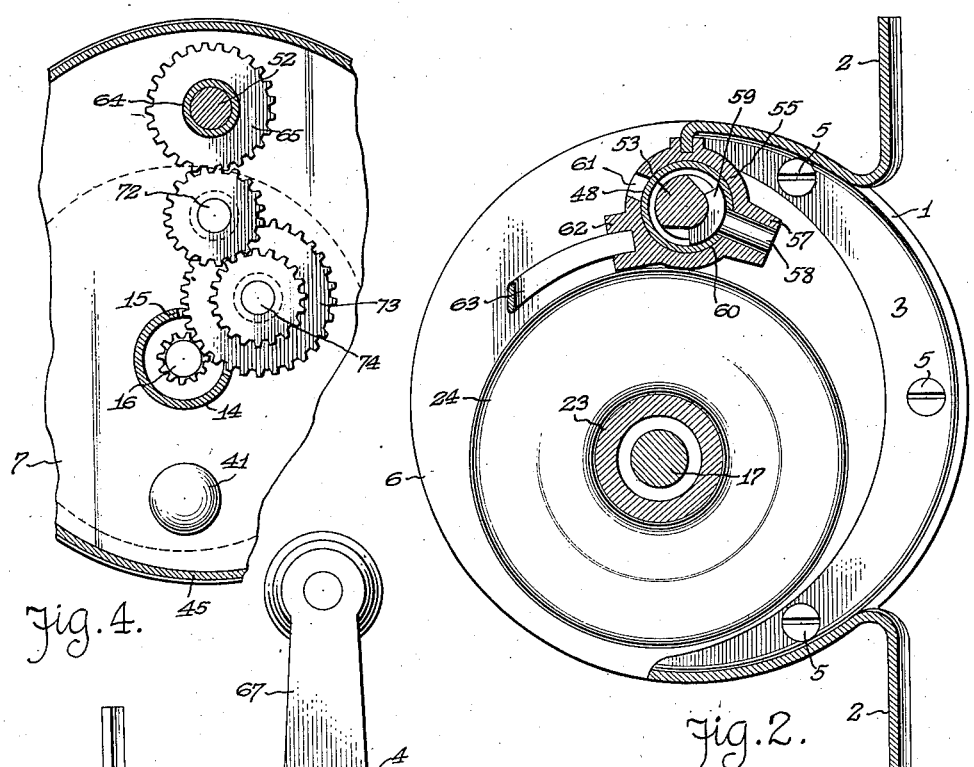
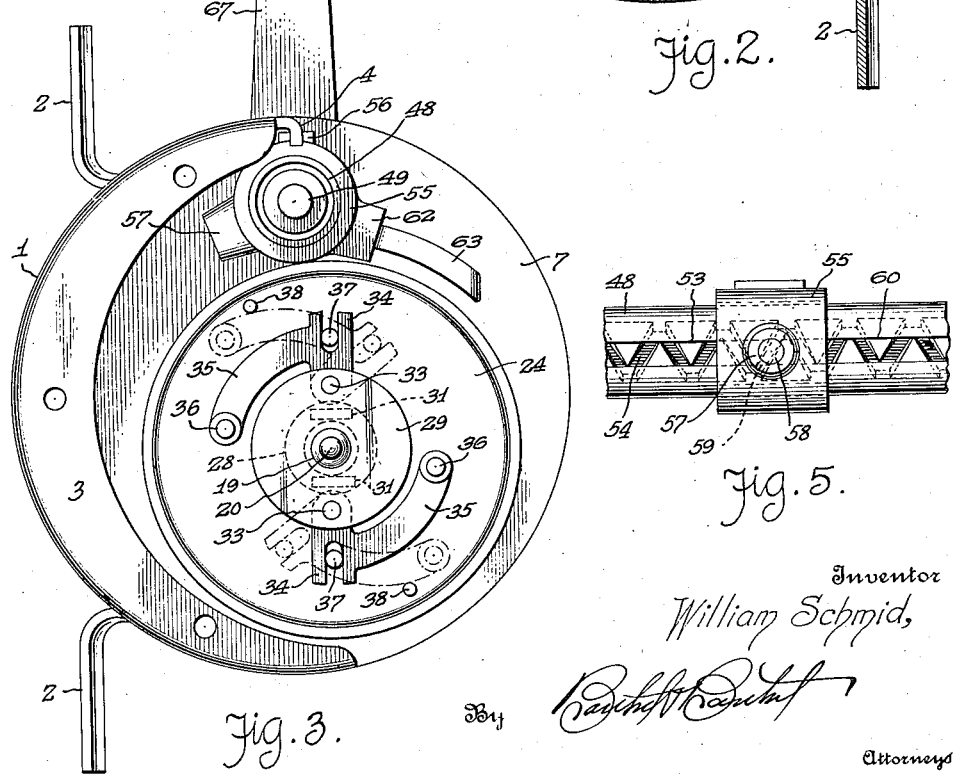
Inventor
William Schmid,
By
Attorneys Patented Oct. 30, 1923.

1,472,684

UNITED STATES PATENT OFFICE.

WILLIAM SCHMID, OF COLDWATER, MICHIGAN.

LEVEL WIND REEL.

Original application filed February 18, 1921, Serial No. 446,142. Renewed April 6, 1923. Divided and this application filed April 29, 1922. Serial No. 557,287.

*To all whom it may concern:*

Be it known that I, WILLIAM SCHMID, a citizen of the United States of America, residing at Coldwater, in the county of Branch and State of Michigan, have invented certain new and useful Improvements in Level Wind Reels, of which the following is a specification, reference being had therein to the accompanying drawings.

My invention aims to provide a high grade level wind and anti-back lash reel embodying certain structural features which will facilitate the casting and recovery of a fish line, and the subject matter of this application has been divided out of my application filed Feb. 18, 1921, Ser. No. 446,142, and renewed April 6, 1923, which application discloses the centrifugal braking mechanism of the reel.

The level winding mechanism includes a stationary slotted sleeve or pillar; a traversing or sliding guide head; a line guide member; a follower, and a screw provided with diamond threads. These elements are compactly and securely organized and represent the only separable pillar of the wide open reel. The mechanism is particularly characterized by the traversing or sliding guide head being guided in its transverse movement by a portion of the reel frame, so that the line guide member will have a defined path of travel relative to the spool of the reel. The mechanism is further characterized by the pinned follower which cannot become accidentally displaced, and the novel manner of mounting the stationary slotted sleeve or pillar relative to the threaded screw reduces friction to a minimum and insures ease of lubrication and response to any actuation by the line of the spool or the driving mechanism thereof.

I am able to recover the line with absolute assurance that it will be evenly wound on the spool, and this is brought about by the level winding mechanism which is operated in synchronism with the spool.

The mechanism entering into my reel will be hereinafter specifically described and then claimed, and reference will now be had to the drawings, wherein—

Fig. 2 is a central cross sectional view of the reel;

Fig. 3 is an end view of a portion of the reel with one of the heads thereof removed showing the governor mechanism;

Fig. 4 is a cross sectional view of a portion of the reel showing a train of gears forming part of the spool driving mechanism.

Fig. 5 is a rear elevation of a portion of the level wind mechanism.

Figure 1:
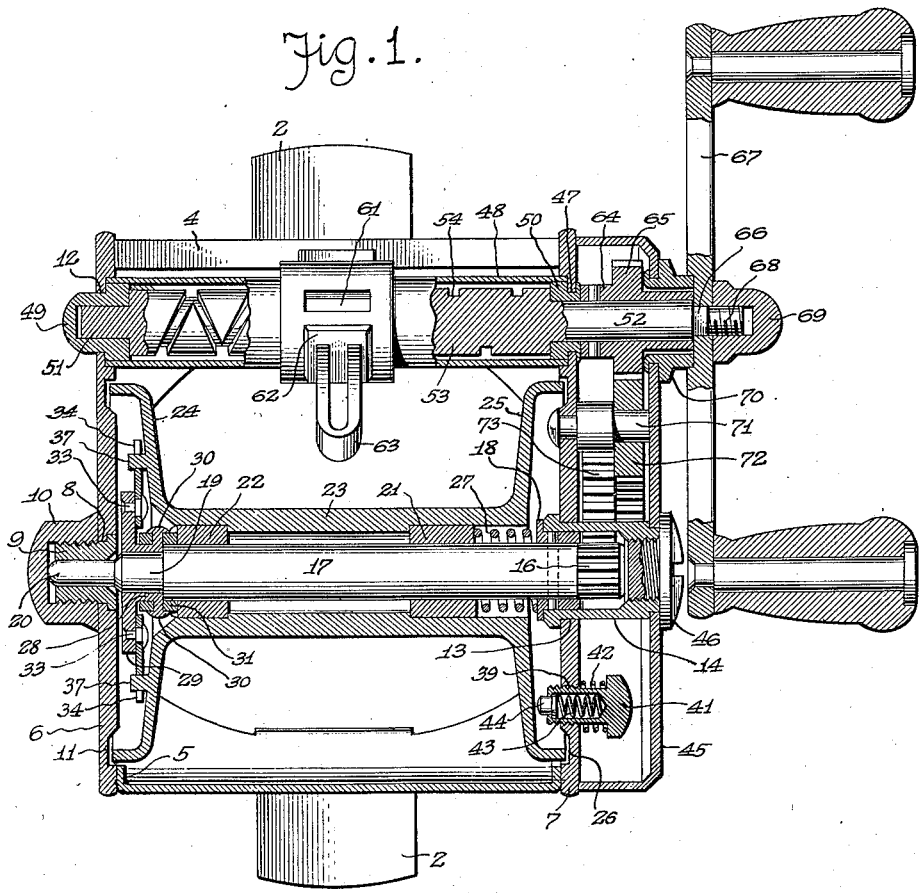
Figure 1 is a longitudinal sectional view of the level wind and anti-backlash reel with portions thereof in elevation.

In describing my invention by aid of the views above referred to, I desire to point out that the same are intended as merely illustrative of a reel by which my invention may be put into practice, and it is to be understood that the structural elements are susceptible to such changes, in size, shape and manner of assemblage as fall within the scope of the appended claims.

In the drawings, the reference numeral 1, denotes a semi-cylindrical reel frame which has the curved wall cut and stamped to afford opposed longitudinally alining reel seat members 2, and the ends of the reel frame 1 are provided with apertured end flanges 3. The front longitudinal edge of the frame 1 is bent to provide a guide rib 4 for the level wind mechanism of the reel, and connected to the end flanges 3 by screws 5 or other fastening means are heads 6 and 7, which cooperate with the reel frame in providing a wide open reel.

The head 6 has an eccentrically disposed opening 8, and mounted in said opening is the flanged inner end of a spool shaft bearing 9 which is exteriorly screwthreaded for a cap or nut 10, said nut bearing against the outer face of the head 6 and anchoring the spool shaft bearing 9 relative to said head. The inner face of the head 6 has the usual annular spool groove 11 and said head adjacent the rib 4, has a stepped or shouldered opening 12 which will be hereinafter referred to.

The head 7 has an opening 13 about the same axis as the opening 8 of the head 6 and in the opening 13 is mounted a barrel 14 which has its wall slotted, as at 15 so as to expose a spool pinion 16 forming part of a spool shaft 17 provided with a fixed flanged collar 18 journaled in the inner end of the barrel 14. The collar 18 abuts the inner end of the barrel 14, serves as a spring abutment and prevents longitudinal shifting of the spool shaft 17. The opposite end of the spool shaft 17 is reduced to provide a shank 19 and a pintle 20, said pintle being journaled in the spool bearing 9 of the head 6.

Rotatable on the spool shaft 17 are bushings 21 and 22 fixed in a spool sleeve 23, this spool sleeve having end members 24 and 25 with the end member 24 confronting the head 6 and the end member 25 confronting the head 7. The peripheral edge of the end member 24 extends into the annular groove 11 of the head 6, and the peripheral edge of the end member 25 is adapted to enter an annular groove 26 provided therefor in the face of the head 7. The end members 24 and 25 cooperate with the spool sleeve 23 in providing a spool or holder for a fish line which may be suitably attached to the spool and wound on the spool.

Detachably mounted against the outer face of the head 7 is a gear housing 45 which has an opening to receive the outer end of the barrel 14 and a large head screw 46 is mounted in the end of the barrel 14 with the head of the screw overlying the wall of the gear housing 45, so that the gear housing is anchored relative to the head 7 and the barrel 14 fixed between the gear housing 45 and the head 7.

Before considering the driving mechanism of the spool, reference will be had to the level winding mechanism located adjacent the rib 4. The head 7 has an opening 47 longitudinally alining with the opening 12 and mounted in the confronting ends of the openings 12 and 47 is a stationary longitudinally slotted sleeve or pillar 48. In one end of the stationary sleeve 48 is a spindle bearing 49 fitted in and projecting from the opening 12 of the head 6, and mounted in the opposite end of the sleeve 48 and fixed in the opening 47 of the head 7 is another spindle bearing 50. The spindle bearings 49 and 50 receive the spindles 51 and 52 of a screw shaft 53 provided with a diamond thread 54 of a conventional form for moving a follower or member back and forth on the shaft 53 when said shaft is revolved.

Slidable on the stationary sleeve 48 is a traversing or sliding tubular guide head 55 having a groove 56 to receive the rib 4 of the reel frame 1. Instead of the groove 56 there may be opposed upstanding flanges at the sides of the rib 4 and said rib prevents turning of the traversing guide heads during the longitudinal movement thereof on the stationary sleeve 48.

At one side of the guide head 55 is a socket 57 to receive the pin 58 of a follower 59, said follower being placed in the sleeve 48 with its pin 58 extending through the longitudinal slot 60 of the sleeve 48. The follower 59 is also placed in position through on opening 61 in the opposite side of the guide head 55 from the socket 57, and said follower is adapted to engage in the diamond thread 54 of the screw shaft 53 and cause a traversing movement of the guide head 55 when the screw shaft 53 is revolved.

Adjacent the opening 61 of the guide head 55 is a socket 62 for a line guide member 63, said line guide member being somewhat U-shaped and curved so that a line may readily pass through the guide member when being wound on the reel spool or cast therefrom.

The shaft spindle 52 is of sufficient length to extend through the gear housing 45 and mounted on the shaft spindle 52 is a hub portion 64 of a gear 65 within the gear housing 45. The shaft spindle 52 protrudes beyond the hub portion 64 of the gear 65 and has a squared or shank portion 66 for a crank 67, and a threaded portion or tank 68 for a nut 69, said nut preventing displacement at the crank 67 relative to the shaft spindle 52. Providing clearance for the shaft spindle 52 and the hub portion 54 of the gear 65 is a ferrule or escutcheon plate 70 mounted in an opening of the gear housing 45, and the wall of the crank 67 is recessed to receive the end of the ferrule or escutcheon plate 70.

On the outer face of the head 7 is a stub shaft 71 provided with a gear 72 meshing with the gear 65, and a compound gear 73 on another stub shaft 74 of the head 7, said compound gear extending into the slot 15 of the barrel 14 to mesh with the spool shaft pinion 16. The train of gears is housed within the gear housing 45 and provides a compact power transmission from the screw shaft spindle 52 to the spool shaft 17, so that the shafts 17 and 53 may be revolved in unison and in timed relation. The ratio between the gears is such as to cause the level winding mechanism to evenly feed a line on to the reel spool as this spool is revolved through the medium of the crank 67.

It is the level wind mechanism feature of my invention to which I attach considerable importance in this application and a careful inspection of the drawing will show that all of the reel parts have been designed to afford a compact construction, manufacture at a comparatively small cost, ease of assembling, and positive control of the fish line when being wound on or unwound from the reel.

What I claim is:—

1. In a fishing reel, the combination with a frame having an inturned integral guide rib, heads carried by said frame, a spool, and a driving mechanism for said spool, of a traversing line guide head operated from said spool driving mechanism, and having a groove to receive the guide rib of said frame and prevent tilting of said guide head.

2. The combination with a semi-cylindrical reel frame having reel seat members and an inturned transverse rib, of a level wind mechanism prevented from tilting by the rib of said frame extending into said mechanism.

3. The combination with a reel frame, and heads carried thereby, of a stationary sleeve carried by said heads with its ends set in from the peripheral edges of said heads, a screw shaft rotatable in said sleeve, a follower adapted to be moved by said shaft and having a portion projecting from one side of said sleeve, a head slidable on said sleeve against said frame and fixed relative to said follower by the projecting portion thereof, and a guide member carried by said head and projecting in an opposite direction from that of the follower projecting portion.

4. In a level wind fish reel having a frame, heads and a screw shaft journaled in said heads:—means for protecting said screw shaft, said means comprising a protecting sleeve for said shaft having its ends in said heads and prevented from turning relative to said heads by a portion said frame parallel to said sleeve.

5. The combination with a fishing reel frame and a line spool, of a stationary sleeve carried by said frame and set in from the marginal edges thereof, a screw shaft rotatable in said sleeve, means adapted for rotating said screw shaft, a guide head slidable on said sleeve, a follower on said screw shaft moved longitudinally of said screw shaft by rotation thereof and articulated with said guide head so as to move said head on said sleeve, and a line guide carried by said head and extending in a circumferential direction relative to said spool.

6. The combination set forth in claim 5, wherein said guide head has a socket portion and the follower is held in place by the socket portion of said guide head, and said guide head has an opening opposite the socket portion thereof and through which opening the follower is inserted into said guide head.

7. In a level wind mechanism, a slotted sleeve, a follower in said sleeve, said follower having a pin, a line guide head on said sleeve having an opening to register with the slot of said sleeve and receive said follower and pin, said guide head having a socket adapted to register with the slot of said sleeve and receive the pin of said follower to locate said follower in said sleeve and fix said follower relative to said guide head, a screw shaft in said sleeve adapted by rotation to reciprocate said follower and said guide head, and stationary means engaging said guide head to prevent rotation of said guide head and sleeve relative to said screw shaft.

In testimony whereof I affix my signature in presence of two witnesses.

WILLIAM SCHMID.

Witnesses:
W. H. SIMONS,
ETHEL DRURY.